United States Patent
Gribkov

(10) Patent No.: US 8,629,988 B2
(45) Date of Patent: Jan. 14, 2014

(54) LASER BEAM IMAGE CONTRAST ENHANCEMENT

(75) Inventor: Mikhail Gribkov, Moscow (RU)

(73) Assignee: JAVAD GNSS, Inc., San Jose, CA (US)

( * ) Notice: Subject to any disclaimer, the term of this patent is extended or adjusted under 35 U.S.C. 154(b) by 454 days.

(21) Appl. No.: 12/426,798

(22) Filed: Apr. 20, 2009

(65) Prior Publication Data

US 2010/0265505 A1    Oct. 21, 2010

(51) Int. Cl.
*G02B 5/122*    (2006.01)

(52) U.S. Cl.
USPC ............ 356/622; 356/620; 356/614; 356/369

(58) Field of Classification Search
USPC .................................. 356/369, 614, 620, 622
See application file for complete search history.

(56) References Cited

U.S. PATENT DOCUMENTS

| | | | |
|---|---|---|---|
| 5,202,742 A * | 4/1993 | Frank et al. ..................... 356/5.1 |
| 5,642,869 A * | 7/1997 | Miller ....................... 246/182 B |
| 5,812,267 A * | 9/1998 | Everett et al. ................. 356/614 |
| 6,290,188 B1 * | 9/2001 | Bassett ...................... 246/182 R |
| 6,465,787 B1 * | 10/2002 | Coulter et al. ............. 250/341.3 |
| 6,580,909 B1 * | 6/2003 | Carro .......................... 455/435.1 |
| 7,720,580 B2 * | 5/2010 | Higgins-Luthman ........... 701/28 |
| 2007/0065002 A1 * | 3/2007 | Marzell et al. ................. 382/154 |
| 2008/0008383 A1 * | 1/2008 | Andel et al. ................... 382/173 |
| 2008/0239457 A1 * | 10/2008 | Scott et al. ..................... 359/291 |
| 2011/0267460 A1 * | 11/2011 | Wang ............................ 348/135 |

FOREIGN PATENT DOCUMENTS

JP    06-066942    * 11/1994    ............. G01S 17/88

* cited by examiner

*Primary Examiner* — Gregory J Toatley
*Assistant Examiner* — Rebecca C Bryant
(74) *Attorney, Agent, or Firm* — Morrison & Foerster LLP

(57) ABSTRACT

An apparatus and method for providing image contrast enhancement is disclosed. A mobile object is equipped with a laser source, polarization filter, and imaging apparatus. The reflection of the laser source output passes through the filter and is received by the imaging apparatus. If the output of the laser source impinges a metallic marker plate located at a pre-determined location, the filter decreases the intensity level of image components not associated with the reflection of the laser source output. The imaging apparatus uses such filtered image components to determine the position and/or orientation of the mobile object.

18 Claims, 5 Drawing Sheets

LASER BEAM IMAGE CONTRAST ENHANCEMENT

BACKGROUND

The present invention relates to image contrast enhancement. More particularly, the present invention relates to image contrast enhancement for positioning or docking applications.

Positioning tasks may be performed using complex and expensive devices such as tachymeters or electronic theodolites. Such positioning devices can include one or more supplementary measurement components, for example, a digital camera or a laser. The digital camera or laser may be used for measurement purposes or to monitor an area of interest. In some cases, even if there is no laser on board, an off-the-shelf laser pointer (such as those used when making presentations to a group of people) may be attached to the object for which positioning is desired.

When using a laser, some type of receiver is required to receive the outputted laser beam for sensing or analysis. In particular, when both the laser and the receiver are located at the object for which positioning is relevant, a digital camera may be used in conjunction with one or more markers placed at known locations. The digital camera captures images of the marker and when the laser beam outputted from the laser impinges on the marker, both the marker and the laser beam are captured in an image, thus providing detection of the laser beam at a known location. Use of the digital camera and marker provides visual laser beam or laser spot recognition without the need for a specific laser receiver, such as a photo detector.

Typically, lasers and digital cameras included as supplementary components to overall complex positioning/measurement devices tend to be of low quality in order to keep costs down. The laser beams tend to have low beam intensity and small laser spot sizes, and/or the digital cameras tend to have significant noise components with insufficient image processing capabilities. Consequently, laser beams may appear almost invisible on captured images and laser beams impinging on a marker may not be detectable.

Even when higher quality lasers and/or digital cameras are used, either as supplementary components or stand alone positioning devices, sophisticated image processing may be required to accurately detect the presence of the laser beam at the marker. This may be the case where ambient lighting is strong or there are other interference effects.

Thus, it would be beneficial to provide a simple and inexpensive method and system for detecting a laser beam at a position marker. It would be beneficial to provide accurate laser detection even using inexpensive and/or low quality laser source and/or imaging apparatus. It would be beneficial to provide image contrast enhancement using standard image scanning. It would be beneficial to provide accurate position detection without requiring additional signal processing. It would be beneficial to provide simple and inexpensive positioning, orientation, or machine control features.

BRIEF SUMMARY OF THE INVENTION

In one embodiment of the invention, a mobile object is equipped for position or orientation determination. The mobile object includes a laser source outputting a laser beam, and a polarization filter operable to receive a reflection of the laser beam as an input. The mobile object further includes an imaging apparatus operable to receive an output of the polarization filter. If the laser beam impinges a metallic marker plate located at a pre-determined location, the polarization filter decreases the intensity level of image components not associated with the reflection while keeping the intensity level of image components associated with the reflection of the laser beam virtually unchanged. The imaging apparatus uses such filtered image components to determine the moment in time when the laser beam impinges the marker plate. Since the location of the marker plate is known, detection of the laser beam impinging the marker plate signifies the presence of the mobile object's proximity to the target zone. Thus, the position and/or orientation of the mobile object may be determined.

In another embodiment of the invention, a method for determining position or orientation of a mobile unit is provided. The method includes providing a laser beam from a laser included in the mobile unit, and receiving an image at an imaging apparatus. The method further includes providing a filter in front of the imaging apparatus, and identifying pixels comprising the image that are at or above a threshold intensity level. A sufficient number of adjacent pixels that are at or above a threshold intensity level are representative of a reflection of the laser beam.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined by the claims attached hereto.

BRIEF DESCRIPTION OF THE DRAWINGS

The exemplary embodiments will become more fully understood from the following detailed description, taken in conjunction with the accompanying drawings, wherein the reference numeral denote similar elements, in which.

The headings provided herein are for convenience only and do not necessarily affect the scope or meaning of the claimed invention.

DETAILED DESCRIPTION

Described in detail below is an apparatus and method for providing image contrast enhancement. A moving or mobile object is equipped with a laser source, polarization filter, and imaging apparatus. The reflection of the laser source output passes through the filter and is received by the imaging apparatus. If the output of the laser source impinges a metallic marker plate located at a pre-determined location, the image received by the imaging apparatus comprises image components associated with the reflection that are for the most part unchanged in brightness after passing through the filter while the remaining image components become less bright after passing through the filter. Hence, determination of the moment when the laser source output hits the metallic marker plate may occur. Such determination permits the position and/or orientation of the moving object to be known.

The following description provides specific details for a thorough understanding of, and enabling description for, embodiments of the invention. However, one skilled in the art will understand that the invention may be practiced without these details. In other instances, well-known structures and functions have not been shown or described in detail to avoid unnecessarily obscuring the description of the embodiments of the invention.

Figure 1:
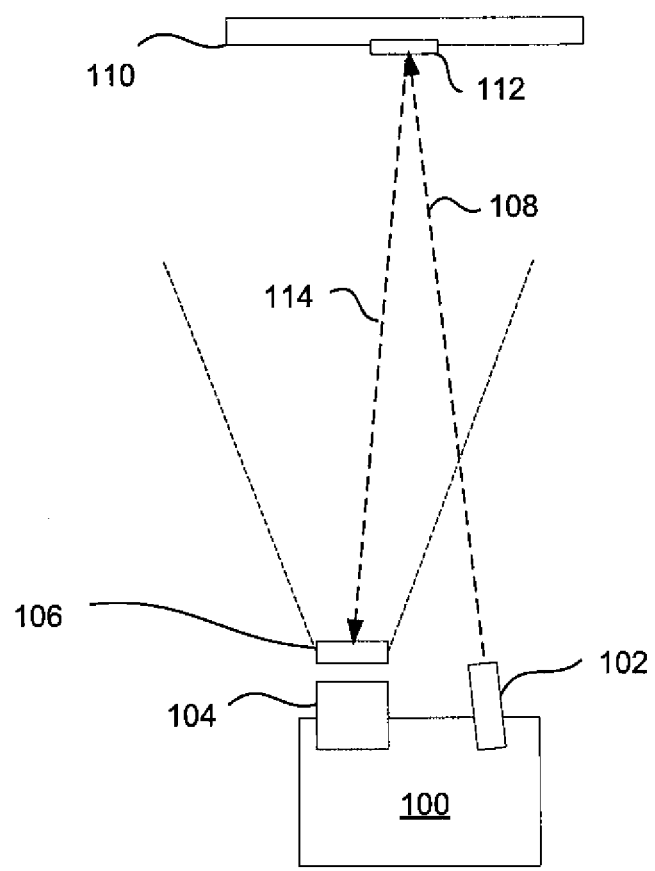
FIG. 1 illustrates a top view of an image contrast enhancement system in accordance with embodiments of the invention.

Referring to FIG. 1, a top view is illustrated of a laser beam image contrast enhancement system in accordance with embodiments of the invention. A unit 100 includes a laser 102, an imaging apparatus 104, and at least one polarization filter 106. A laser beam 108 outputted from the laser 102 impinges a marker 110, and more particularly, a plate 112 located on a front side of the marker 110. At least a portion of the laser beam 108 is reflected by the plate 112 and the resulting diffuse reflection 114 (or at least a portion thereof) propagates toward the unit 100. The diffuse reflection 114 may be received by the imaging apparatus 104 after passing through the polarization filter 106. The diffuse reflection 114 comprises an image of the laser beam 108 formed by diffuse reflection.

The unit 100 comprises any of a variety of devices or structures in which device positioning and/or orientation is relevant. For example, the unit 100 may comprise, but is not limited to, a vehicle, machinery, mobile devices, tri-pod, or other complex devices capable of changing position and/or orientation. The laser 102 may comprise, but is not limited to, a laser source, a laser pointer, a Class 2 laser, a laser system including a laser source and associated optics to achieve a desirable laser beam 108, or a variety of other laser devices capable of outputting the laser beam 108 as discussed in detail below. The imaging apparatus 104 may comprise, but is not limited to, a still camera, a video camera, a digital camera, or other image capture device capable of sufficiently registering laser beam intensity variations as discussed in detail below. The imaging apparatus 104 includes a processor for performing image scanning and pixel intensity evaluation. Alternatively, the unit 100 may includes a separate processor for performing image scanning and pixel intensity evaluation. In still other alternative, the processor may be remotely located from the unit 100.

The filter 106 comprises one or more polarizing filters (also referred to as polarization filter(s)) located in front of the imaging apparatus 104 (e.g., in between the imaging apparatus 104 and the plate 112). The filter 106 may comprise a single polarization filter, such as a circular polarization (C-PL) filter or a linear polarization (L-PL) filter. Alternatively, the filter 106 may comprise two or more polarization filters, in which case the filter closest to the imaging apparatus 104 may be a C-PL or L-PL filter while all of the other filter(s) are L-PL filter(s).

Each of the laser 102, imaging apparatus 104, and/or filter 106 may be located external or integral to the unit 100, removable from the unit 100, or be unrelated off-the-shelf components (such as an inexpensive laser pointer and digital camera) that are attached to the unit 100 using tape, adhesive, or other attachment mechanisms. The laser 102, imaging apparatus 104, and/or filter 106 may be inexpensive components that lack features common in complex positioning and/or orientation tasks.

The plate 112 comprises a plate or marker made of a metallic material, metallic coating, or other material capable of sufficient (diffusive) reflection of the laser beam 108 and which does not change the polarization of the laser beam 108 after reflection (e.g., polarization of the laser beam 108 and diffuse reflection 114 stays the same). The size of the plate 112 need not be large. For example, the size may be 2 by 4 centimeter (cm). The size or shape of the plate 112 may be variable as long as the dimensions of the plate 112 are larger than the diameter of the laser beam 108 at the plate 112. In alternate embodiments, the marker 110 may be omitted since it is the interaction between the laser beam 108 and the plate 112 that is of relevance.

The laser beam 108 forms an angle greater than zero degrees and less than 90 degrees to a line perpendicular to the plane of the plate 112 (also referred to as the angle of inclination). The imaging apparatus 104 is positioned/oriented such that the point or location at which the laser beam 108 hits the plate 112 would be in the imaging apparatus' 114 field of view. The filter 106 is located between the imaging apparatus 104 and plate 112, and sufficient to filter all image components received by the imaging apparatus 104.

Orientation of the filter 106 is configured so that its main plane of transmission is (substantially) parallel to the plane of polarization of the laser beam 108. Using the filter 106, the overall brightness of the image captured by the imaging apparatus 104 decreases while the brightness of the image portion associated with the diffuse reflection 114 remains unchanged. The overall brightness of the image captured by the imaging apparatus 104 may be reduced by a factor of two compared to the same image captured without the filter 106. Image components that are not polarized or do not have a plane of polarization substantially parallel to the filter's main plane of transmission experience intensity decrease at the output of the filter 106.

Figure 2:
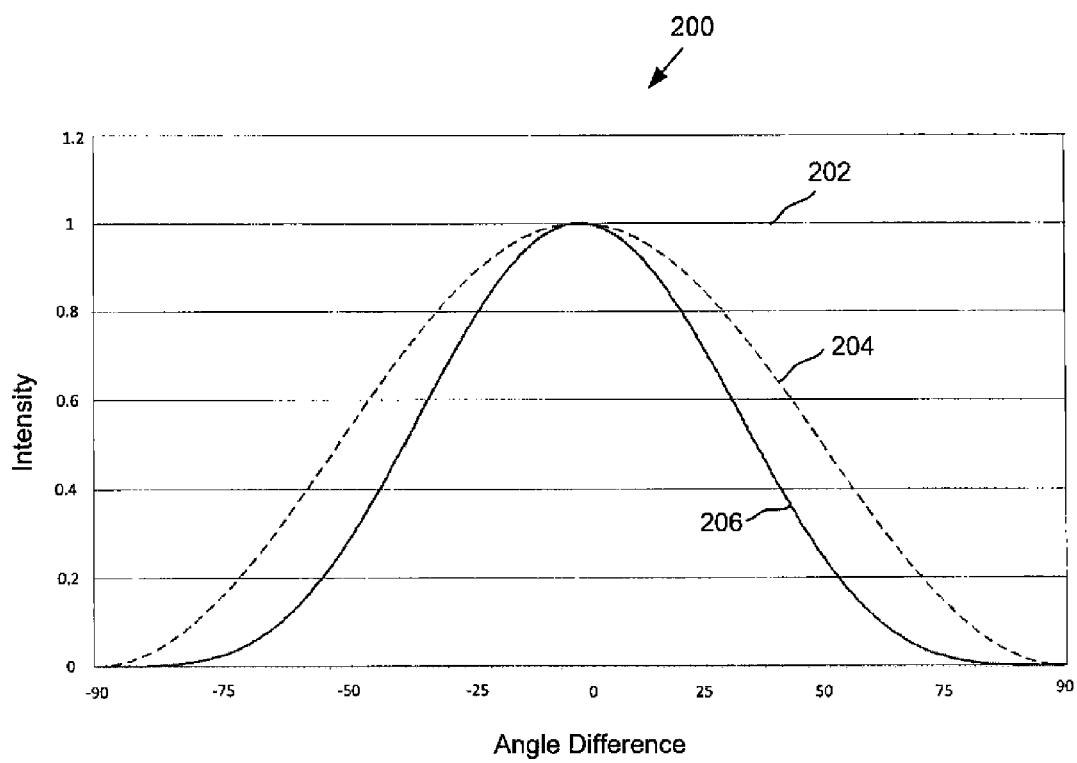
FIG. 2 illustrates a plot showing light intensity using different filters in accordance with embodiments of the invention.

FIG. 2 illustrates a plot 200 showing light intensity under various filter conditions in accordance with embodiments of the invention. The vertical axis denotes intensity and the horizontal axis denotes the difference in angle between the main transmission plane of the filter 106 and the plane of polarization of any incoming beam. If the filter 106 is not present, then the intensity is constant for all angles (line 202). A dotted line 204 illustrates intensity distribution as a function of the angle difference in the presence of a single polarization filter. A solid line 206 illustrates intensity distribution as a function of the angle difference in the presence of two polarization filters. Even if one or more polarization filters is employed, the light intensity remains mostly unchanged for light passing through the filter 106 having a polarization plane parallel to the filter main transmission plane (e.g., having an angle difference of approximately zero degrees). However, for light passing through the filter 106 having a polarization plane not parallel to the filter main transmission plane, the light intensity decreases as the angle difference increases.

If the laser 102 comprises a Class 2 laser source and the plate 112 comprises certain materials and/or color, the laser beam 108 hitting the plate 112 even without the filter 106 may result in an intensity that is 1.2 times over the same system without the plate 112. If the plate 112 and the filter 106 (in the form of a single filter) are employed, the intensity may rise to 1.5 times over a system without the plate 112 and filter 106. If the plate 112 and the filter 106 (in the form of two filters) are employed, the intensity may rise to 1.8 times over a system without the plate 112 and filter 106.

The relative intensity or brightness corresponding to the laser 102, $I_{rel}$, may be defined as $I_{rel}=I/I_{sc}$, where I is the brightness of the diffuse reflection 114 of the image captured by the imaging apparatus 104 and $I_{sc}$ is the average brightness of the image captured by the imaging apparatus 104. Because $I_{sc}$ decreases using the filter 106, $I_{rel}$ increases approximately 1.6-1.8 times.

Such increase in contrast improves positioning of the unit 100. Contrast enhancement makes it easier to determine the moment at which the laser beam 108 impinges the plate 112, as opposed to some other object. With the location of the plate 112 known and detection of the moment at which the laser beam 108 hits the plate 112 made easier, real-time positioning of the unit 100 may be provided.

Figure 3:
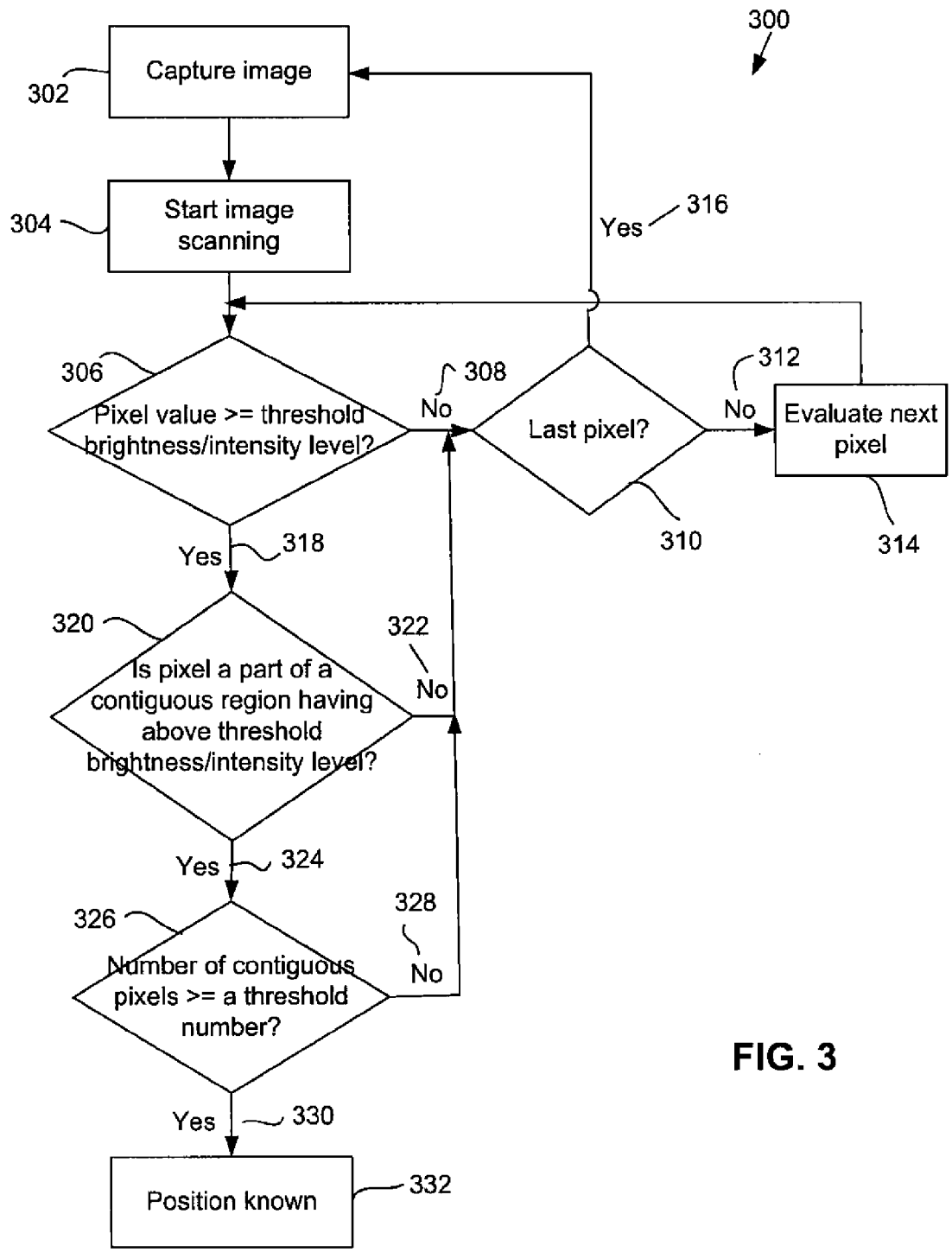
FIG. 3 illustrates a flow diagram for implementation of image contrast enhancement in accordance with embodiments of the invention.

FIG. 3 illustrates a flow diagram 300 for implementing image contrast enhancement in accordance with embodiments of the invention. As the unit 100 moves or is moved to different position(s), the laser 102 continues to output the laser beam 108 and the corresponding diffuse reflection 114 passes through the filter 106 for capture by the imaging apparatus 104. The imaging apparatus 104 continuously or periodically captures images. When an image has been captured by the imaging apparatus 104 (block 302), a processor starts image scanning (block 304) to identify image pixel(s) having an intensity level above a threshold brightness/intensity level. The threshold brightness/intensity level may be found empirically depending on the configuration of the unit 100 and planned environmental conditions. Continuing the example above of the Class 2 laser source with a single filter, the threshold level may be set to around 1.5 times the average image brightness level. The threshold value may be any value sufficient to delineate brightness/intensity values representative of the diffuse reflection 114 from other light sources or image components.

Next at a block 306, the brightness/intensity value of the first pixel in the image is compared against the preset threshold brightness/intensity level or value. If the pixel value is less than the threshold value (branch 308) and the pixel is not the last pixel in the image (block 310 and branch 312), then the next pixel in the image is evaluated (block 314). Otherwise if the pixel value is equal to or greater than the threshold value (branch 318), then the processor determines if the current pixel is part of a contiguous region having above threshold brightness/intensity values (block 320).

If the pixel is not part of a contiguous region (branch 322), it is unlikely that the pixel value is indicative of the laser beam 108 hitting the plate 112 and scanning continues via blocks 310 and 314. Otherwise being part of a contiguous region (branch 324) makes it more likely that the pixel value represents the laser beam 108 hitting the plate 112. Then at a block 326, the processor determines if the region of high brightness/intensity level is sufficiently large enough to correspond to the laser beam 108 hitting the plate 112. A threshold number of contiguous pixels may be determined empirically based on the spot size of the diffuse reflection 114.

If the number of contiguous pixels is less than the threshold number (branch 328), then scanning continues via blocks 310 and 314. Either the high brightness/intensity levels of the pixels is due to something other than the laser beam 108 hitting the plate 112, or the laser beam 108 is hitting the plate 112 but evaluation of additional pixels are necessary to confirm that condition. On the other hand, if the number of contiguous pixels is above the threshold number (branch 330), then the pixel values are representative of the laser beam 108 impinging on the plate 112 and the position of the unit 100 is known (block 332).

The flow diagram 300 repeats continuously or periodically as appropriate with the rate of image capture by the imaging apparatus 104 and processing speed. It is understood that certain processing tasks may occur simultaneously. For example, blocks 306, 320, and/or 326 may take place simultaneously if the processor possesses sufficient processing power or there is a need for faster processing. As another example, blocks 306, 320, and/or 326 may be performed for more than one pixel at a time, such that parallel image scanning occurs.

Figure 4:
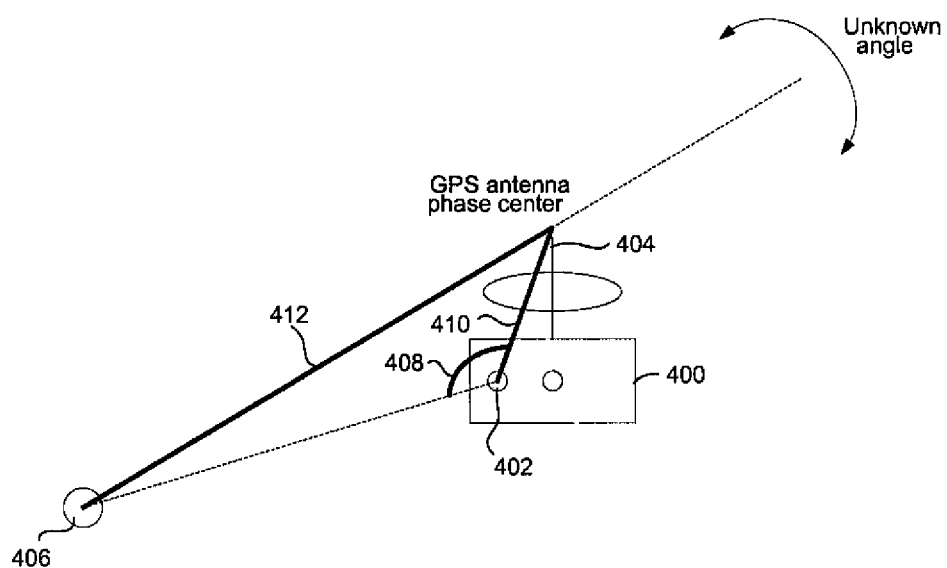
FIG. 4 illustrates a scheme for determining orientation of a unit in accordance with embodiments of the invention.

Ease in laser recognition may be used to solve a variety of positioning, machine control, or orientation problems. As an example, a unit 400 equipped similar to that of the unit 100 is shown in FIG. 4. Component 402 is representative of a laser source, polarization filter(s), and imaging apparatus. The unit 400 is further equipped with a global positioning system (GPS) receiver 404 or other positioning system. The GPS receiver 404 may be sufficient to determine the position of the unit 400. However, the GPS receiver 404 alone is insufficient to provide the orientation of the unit 400. By employing the GPS receiver 404 in conjunction with the component 402 and a plate or marker 406, the orientation of the unit 400 can be determined. Angle 408, length 410, and length 412 are known or may be directly calculated from each other, thereby revealing the orientation of the unit 400. The angle of rotation around the axis formed by the center of the plate 406 and the GPS receiver 404 antenna phase center remains as the last unknown orientation variable.

Figure 5:
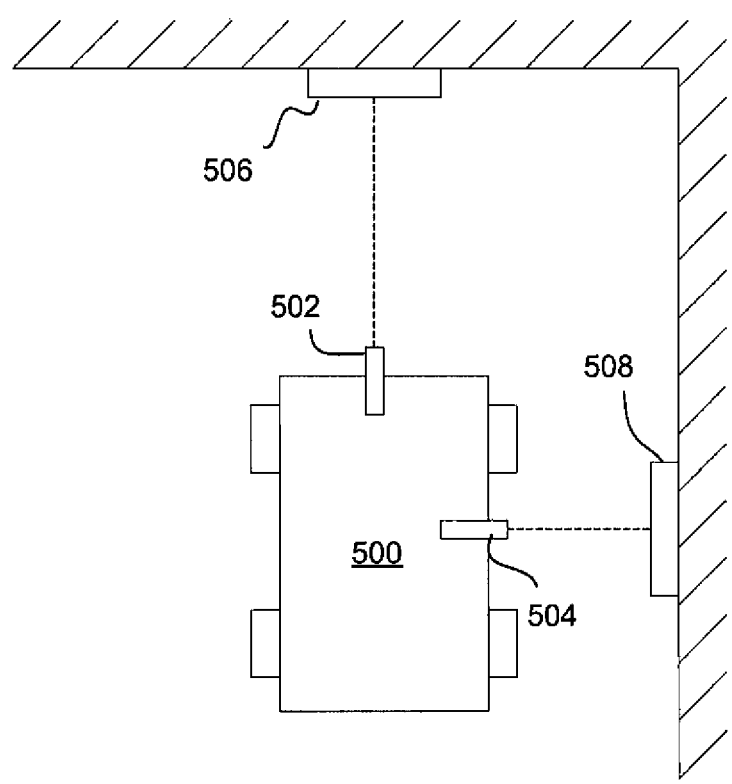
FIG. 5 illustrates a scheme for determining entry or departure of a unit in accordance with embodiments of the invention.

As another example, FIG. 5 illustrates vehicle docking using contrast enhancement. A vehicle 500 (or other moving or movable unit such as a pallet) includes a first contrast enhancement component 502 and a second contrast enhancement component 504. Each of the first and second contrast enhancement components 502, 504 comprises a laser source, filter(s), and imaging apparatus as discussed with respect to FIG. 1. The first and second components 502, 504 are positioned on the vehicle 500 such that their respective beam pathways are not parallel to each other (e.g., respective beam pathways are perpendicular to each other). Correspondingly, a destination region of the vehicle 500 includes a first plate 506 and second plate 508 positioned to respectively intersect the beam pathways of the first and second components 502, 504. First and second plates 506, 508 are similar to the plate 112. Using dual contrast enhancement mechanisms, entry and departure of the vehicle 500 from the destination region may be monitored as well as the orientation of the vehicle 500 in the destination region.

In this manner, position and/or orientation of moving objects may be readily detected without requiring high quality imaging apparatus, laser detectors, particular laser sources, or extensive computations. Instead, inexpensive components may be used along with simple image processing to achieve improved detection based on image contrast enhancement. A metallic marker plate along with one or more polarization filters take advantage of the polarization inherent in the laser source output. The image components received by the imaging apparatus that are not associated with the output of the laser source has a significantly lower brightness/intensity value compared with the image components associated with the laser output. Thus making it easier to distinguish the laser output component, when present, from other image components.

The invention can be implemented in any suitable form including hardware, software, firmware or any combination thereof. Different aspects of the invention may be implemented at least partly as computer software or firmware running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the claims. Additionally, although a feature may appear to be described in connection with a particular embodiment, one skilled in the art would recognize that various features of the described embodiments may be combined in accordance with the invention. Moreover, aspects of the invention describe in connection with an embodiment may stand alone as an invention.

While the invention has been described in terms of particular embodiments and illustrated figures, those of ordinary skill in the art will recognize that the invention is not limited to the embodiments or figures described. One or more aspects of one or more embodiments may be combined to form additional embodiments. The figures provided are merely representational and may not be drawn to scale. Certain proportions thereof may be exaggerated, while others may be minimized. The figures are intended to illustrate various implementations of the invention that can be understood and appropriately carried out by those of ordinary skill in the art. Therefore, it should be understood that the invention can be practiced with modification and alteration within the spirit and scope of the appended claims. The description is not intended to be exhaustive or to limit the invention to the precise form disclosed. It should be understood that the invention could be practiced with modification and alteration. From the foregoing, it will be appreciated that specific embodiments of the invention have been described herein for purposes of illustration, but that various modifications may be made without deviating from the spirit and scope of the invention. Accordingly, the invention is not limited except as by the appended claims and equivalents thereof.

The terms "computer program product," "computer-readable medium," and the like may be used generally to refer to media such as, for example, the processor used for image scanning. These and other forms of computer-readable media may be involved in storing one or more sequences of one or more instructions to perform specified operations. Such instructions, generally referred to as "computer program code" (which may be grouped into the form of computer programs or other groupings), when executed, enable the system to perform features or functions of embodiments of the present invention. Note that the code may directly cause the processor to perform specified operations, be compiled to do so, and/or be combined with other software, hardware, and/or firmware elements to do so.

Moreover, although individually listed, a plurality of means, elements, or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A mobile object equipped for position or orientation determination, comprising:
   a laser source configured to output a laser beam;
   a polarization filter;
   an imaging apparatus configured to receive an output of the polarization filter and output an image comprising a plurality of pixels; and
   a processor in communication with the imaging apparatus and configured to:
      identify a reflection of the laser beam from a marker in the image by performing image scanning to identify a threshold number of contiguous pixels of the plurality of pixels that are at or above a threshold intensity level; and
      determine a position or an orientation of the mobile object relative to the marker based upon the identified reflection of the laser beam from the marker.

2. The mobile object of claim 1, wherein the marker is located at a predetermined location, the reflection comprises diffuse reflection, and the marker is a metallic marker.

3. The mobile object of claim 1, wherein the polarization filter comprises a circular polarization filter.

4. The mobile object of claim 1, wherein the polarization filter comprises a linear polarization filter.

5. The mobile object of claim 1, wherein the polarization filter comprises a linear polarization filter and a second polarization filter.

6. The mobile object of claim 1, wherein a main plane of transmission of the polarization filter is substantially parallel to a plane of polarization of the laser beam.

7. The mobile object of claim 1, wherein the threshold intensity level is equal or greater than intensity levels associated with the rest of the image.

8. A method for determining position or orientation of a mobile unit, comprising:
   providing a laser beam from a laser included in the mobile unit;
   generating an image comprising a plurality of pixels at an imaging apparatus;
   providing a filter in front of the imaging apparatus; and
   identifying a reflection of the laser beam from a marker in the image by performing image scanning to identify a threshold number of contiguous pixels of the plurality of pixels that are at or above a threshold intensity level; and
   determining a position or an orientation of the mobile unit relative to the marker based upon the identified reflection of the laser beam from the marker.

9. The method of claim 8, wherein the marker is a metallic target at a predetermined location.

10. The method of claim 9, further comprising generating the reflection of the laser beam from the laser beam impinging the metallic target.

11. The method of claim 8, wherein the filter comprises one or more polarization filters.

12. The method of claim 8, wherein providing the filter includes orientating a main plane of transmission of the filter substantially parallel to a plane of polarization of the laser beam.

13. A system for determining a position or orientation of a mobile unit based on laser contrast enhancement, comprising:
   a target; and
   a mobile unit including:
      a laser configured to output a beam,
      an imaging apparatus configured to capture images, each captured image comprising a plurality of pixels,
      a polarization filter located in front of the imaging apparatus and configured to decrease intensity of incoming light not having a plane of polarization substantially parallel to a main plane of transmission of the polarization filter;
      a processor in communication with the imaging apparatus and configured to identify a reflection of the laser beam from the target in the captured images by performing image scanning to identify a threshold number of contiguous pixels in the captured images that are at or above a threshold intensity level; and a positioning system configured to determine a position of the mobile unit based on the identified reflection of the laser beam from the target.

14. The system of claim 13, wherein the beam impinges the target to generate a diffuse reflection and the diffused reflection is included in an image captured by the imaging apparatus.

15. The system of claim 14, wherein the mobile unit is in a line of sight to the target and oriented for the beam to impinge on the target.

16. The system of claim 13, wherein the positioning system is a global positioning system.

17. The mobile object of claim 1 further comprising:

a positioning system configured to determine the position of the mobile object based upon the orientation of the mobile object.

18. The mobile object of claim 1, wherein the positioning system is a global positioning system receiver.

\* \* \* \* \*